Patented Jan. 24, 1950

2,495,298

UNITED STATES PATENT OFFICE 2,495,298

PROCESS FOR THE PREPARATION OF THROMBIN

Albert Szent-Gyorgyi, Woods Hole, Mass., and Kálmán Laki and Mihály Gerendás, Budapest, Hungary No Drawing. Application November 5, 1947, Serial No. 784,308. In Hungary December 28, 1945

Section 1, Public Law 690, August 8, 1946
Patent expires December 28, 1965

10 Claims. (Cl. 260—112)

This invention relates to the production of a blood clotting preparation and it has particular relation to a new and improved process for obtaining thrombin from blood.

The main object of the present invention consists in providing a process for obtaining thrombin free from impurities and in good yield, from blood, preferably cattle blood, such as hog or horse blood.

Another object of the invention is to provide a process in which first prothrombin is recovered from blood and the prothrombin is converted into thrombin under conditions in which losses in thrombin are substantially reduced or prevented.

A further object of the invention consists in obtaining thrombin in solid, dry form in which it can be conveniently concentrated and purified by further treatment.

It is also an object of the invention to obtain thrombin in form of aqueous solutions or dispersions, which are stable and adapted for therapeutical applications.

Further objects and the advantages of the invention will be apparent from the appended claims and the following specification, which describes, by way of example, some preferred embodiments of the invention.

In carrying out the present invention, fresh blood, for example horse blood, is mixed with an anti-coagulant, and the mixture is diluted. If desired, this dilution may take place after mechanical separation of the blood corpuscles from the mixture of blood with the anti-coagulant solution. The diluted liquid is precipitated by the addition of a suitable amount of organic or inorganic acid, in order to form a precipitate in which the precursor of the clottting substance of the blood, the so-called prothrombin, is present. This precipitate is dissolved in an aqueous, slightly alkaline salt solution, in which the prothrombin is subsequently converted into thrombin by the addition of calcium chloride and some kinase preparation. However, it has been found that by proceeding in this manner, substantial losses in thrombin may occur as, owing to reasons not clearly understood, the amount of the available thrombin may quickly decrease in the solution. It may be that these losses are due partly to absorption by protein compounds, and partly to the effect of an inactivating ferment. It has been found that they can be substantially reduced or prevented by adding to the prothrombin-containing solution, prior to the before-mentioned addition of calcium chloride and kinase preparation, a lipoid solvent, particularly chloroform, and a substance such as $\alpha,\alpha'$-dipyridyl, which is capable of binding metal ions, e. g. iron ions and forming non-dissociable complex compounds with said ions.

After the addition of chloroform and $\alpha,\alpha'$-dipyridyl or the like, calcium chloride and kinase preparation are introduced into the solution, whereupon conversion of prothrombin into thrombin takes place, and a coagulated material separates from the solution. As soon as the formation of thrombin is completed, the solution is quickly and completely separated from the clot or coagulated material and the separated liquid is mixed with a precipitating agent, preferably acetone, in order to precipitate the thrombin. The precipitate is mechanically separated from the liquid, washed with dry acetone and dried in the air. In the precipitation of thrombin, it has been found advisable to carry out precipitation with acetone in cooled solutions, so that precipitation takes place at low temperatures, preferably at about 0° C. Upon the addition of acetone to the solution, the temperature of the latter increases, and it is of advantage to prevent rising of the temperature above 15°–20° C.

The thrombin thus obtained may be concentrated and purified by dissolving the dry product in distilled water, mechanically separating the solution from undissolved substances, precipitating the thrombin solution by the addition of acetone, separating the precipitated thrombin from the liquid and washing and drying the thrombin. Such concentration and purification may be repeated, as described further below.

*Example.*—Fresh blood recovered for example at the slaughter-house is poured directly into an anti-coagulant solution, e. g. a 2% aqueous solution of sodium oxalate, $\frac{1}{10}$ part by volume of this solution being used for one part by volume of the blood. From the oxalated blood thus obtained, the blood corpuscles are mechanically separated, e. g., by centrifuging, but this separation may be omitted, if desired. The liquid is then diluted with water, which does not contain substances, such as calcium compounds, which form precipitates with oxalates. In this diluting step, the ratio of blood and water should be at least 1:5, and preferably it should be 1:10–15. From the diluted liquid, prothrombin is precipitated by the addition of an organic or inorganic acid, such as acetic acid or hydrochloric acid. The amount of acid to be added is determined in such a manner that at the pH of the liquid, occurring after the addition of the acid, the largest possible amount of precipitate is obtained. The necessary amount of acid may be determined in preliminary tests. The pH value yielding an optimum amount of precipitate depends largely on the origin of the blood used, on the age or breed of the animal, the blood of which is used, and other factors. Good results may be obtained by using, for example, acetic acid and a pH of 4.8–5.8. The precipitate thus formed is mechanically separated from the liquid, preferably by centrifuging, and the collected precipitate is dissolved in a slightly alkaline physiologic salt solution which is free from calcium compounds and has a pH of at least 7.2. Good results have been obtained by using an aqueous solution containing 0.7% of NaCl, 0.04% of sodium oxalate and 0.23% of sodium bicarbonate. 12 liters of this solution are sufficient for dissolving the precipitate formed in the diluted liquid obtained from 50 liters plasma and 450 liters of water.

The dissolved prothrombin is now converted into thrombin by the addition of a suitable amount of an aqueous CaCl$_2$ solution and some kinase preparation. For example, 2.5 parts by volume of a 2% aqueous solution of CaCl$_2$ and 10 parts by volume of a kinase suspension prepared in the manner described hereinafter are gradually added to 100 parts by volume of the above mentioned solution of the prothrombin-containing precipitate in the physiologic salt solution. However, as mentioned above, in order to prevent decrease of the thrombin once formed in the solution, prior to the addition of the calcium chloride solution and kinase preparation, a lipoid solvent, preferably chloroform, and a substance capable of binding metal ions, e. g. iron ions and forming non-dissociable complex compounds with the latter are added to the prothrombin-containing solution. Such substances are apparently capable of reducing or preventing fermentative disintegration of thrombin. The preferred substance used for this purpose is $\alpha,\alpha'$-dipyridyl of the formula C$_{10}$H$_8$N$_2$

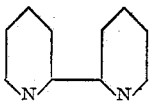

For example, 0.1 part by volume of chloroform and 0.01 part by weight of $\alpha,\alpha'$-dipyridyl are added to 100 parts by volume of the prothrombin solution of the above described composition, prior to the addition of calcium chloride and kinase. Upon the addition of the latter a coagulated material separates from the solution and thrombin is formed in the solution. As soon as the thrombin formation is completed, which can be determined by analytical tests, the liquid is quickly and completely separated from the coagulated material. The liquid is now cooled, preferably to about 0° C., and the thrombin is precipitated by mixing it with the double amount of acetone. The thrombin thus precipitated is separated by centrifuging and washed on the suction filter with dry acetone. A half-dry powder is thus obtained, which is then further dried on the air. The thrombin is thus obtained in a yield of 70–80% based on the amount of thrombin present in the solution prior to the precipitation with acetone.

The thrombin prepared in the above described manner may be purified by dissolving it in distilled water, separating the undissolved residue from the solution, and precipitating the latter with acetone. This purifying step may be carried out several times, if desired.

It has been found that stable aqueous thrombin solutions or dispersions may be obtained if the thrombin solution or dispersion contains chloroform up to the saturation point and $\alpha,\alpha'$-dipyridyl in an amount of about 0.1%.

The kinase preparation mentioned above may be obtained for example by mixing 250 g. of ox brain pulp with 500 cm.$^3$ of acetone. The mixture is centrifuged, the solid residue is mixed again with 500 cm.$^3$ of acetone, centrifuged again and the residue is dried on filter paper to a dry powder. 5 g. of this powder are dispersed in 100 cm.$^3$ of a 0.7% aqueous solution of NaCl and this solution is used as described above.

It is to be understood that the present invention is not limited to the specific steps and substances described above. For example, instead of the anti-coagulant used in the above example, and instead of the acids mentioned above, other anti-coagulants and other acids, respectively, may be used. Furthermore, instead of chloroform, a substantially equal amount of bromoform or ethyl-alcohol, and, instead of $\alpha,\alpha'$-dipyridyl, o-hydroxy-quinoline sulfate (known under the trade-name "chinosol"), may be added to the prothrombin solution. Said sulfate is preferably used in an amount of 1 g. per liter of the prothrombin solution, and it may also be used, in a concentration of about 1%, for stabilizing aqueous thrombin solutions. Instead of acetone, methyl alcohol or ethyl alcohol may also be used, although the use of acetone is preferred. These and other modifications may be made without departing from the scope of the invention as defined in the appended claims.

What is claimed is:

1. In a process for the preparation of thrombin from blood by separating from the blood prothrombin and converting the latter into thrombin, the step of carrying out the conversion of prothrombin into thrombin in a solution in the presence of a lipoid solvent selected from the group consisting of chloroform, bromoform and ethylalcohol, and a substance forming non-dissociable complex compounds with metal ions and selected from the group consisting of $\alpha, \alpha'$-dipyridyl and o-hydroxy quinoline sulfate.

2. In a process for the preparation of thrombin from blood mixed with an anti-coagulant, by separating from the blood prothrombin by the addition of acid, dissolving said prothrombin in an aqueous salt solution, and converting the dissolved prothrombin into thrombin, the step of carrying out the conversion of prothrombin into thrombin in a solution in the presence of a lipoid solvent selected from the group consisting of chloroform, bromoform and ethylalcohol, and a substance forming non-dissociable complex compounds with metal ions and selected from the group consisting of $\alpha, \alpha'$-dipyridyl and o-hydroxy quinoline sulfate.

3. In a process for the preparation of thrombin from blood mixed with sodium oxalate and diluted with water, by precipitating prothrombin with acid, dissolving the precipitate in a slightly alkaline physiologic aqueous salt solution, and converting the dissolved prothrombin into thrombin, the step of carrying out the conversion of prothrombin into thrombin in a solution in the presence of a lipoid solvent selected from the group consisting of chloroform, bromoform and ethylalcohol, and a substance forming non-dissociable complex compounds with metal ions and selected from the group consisting of $\alpha, \alpha'$-dipyridyl and o-hydroxy quinoline sulfate.

4. In a process for the preparation of thrombin from blood mixed with an anti-coagulant, by separating from the blood prothrombin by the addition of acid, dissolving said prothrombin in an aqueous salt solution, and converting the dissolved prothrombin into thrombin, the step of carrying out the conversion of prothrombin into thrombin in a solution in the presence of chloroform and $\alpha, \alpha'$-dipyridyl.

5. In a process for the preparation of thrombin from blood mixed with an anti-coagulant, by separating from the blood prothrombin by the addition of acid, dissolving said prothrombin in an aqueous salt solution, and converting the dissolved prothrombin into thrombin, the step of carrying out the conversion of prothrombin into thrombin in a solution in the presence of about 0.1 part by volume of chloroform and 0.01 part by weight of $\alpha, \alpha'$-dipyridyl in 100 parts by volume of the solution.

6. In a process for the preparation of thrombin from blood mixed with an anti-coagulant, by separating from the blood prothrombin by the addition of acid, dissolving said prothrombin in an aqueous salt solution, and converting the dissolved prothrombin into thrombin, the step of carrying out the conversion of prothrombin into thrombin by the addition of calcium chloride and kinase preparation to a solution containing about 0.1 part by volume of chloroform and 0.01 part by weight of $\alpha, \alpha'$-dipyridyl in 100 parts by volume of the solution.

7. In a process for the preparation of thrombin from blood by separating from the blood prothrombin and converting the latter into thrombin, the step of carrying out the conversion of prothrombin into thrombin in a solution in the presence of a lipoid solvent selected from the group consisting of chloroform, bromoform and ethyl-alcohol and a substance forming non-dissociable complex compounds with metal ions and selected from the group consisting of $\alpha, \alpha'$-dipyridyl and o-hydroxy quinoline sulfate, and the subsequent step of precipitating thrombin by the addition of acetone to the said solution cooled up to about 0° C.

8. In a process for the preparation of thrombin from blood by separating from the blood prothrombin and converting the latter into thrombin, the step of carrying out the conversion of prothrombin into thrombin in a solution in the presence of chloroform and $\alpha, \alpha'$-dipyridyl, and the subsequent step of precipitating thrombin by the addition of acetone to the said solution at a temperature of about 0° C.

9. A stable aqueous thrombin composition containing about 0.1% of $\alpha, \alpha'$-dipyridyl and being saturated with chloroform.

10. A process for preparing a stable aqueous thrombin solution, said process comprising dissolving thrombin in water saturated with chloroform and containing about 0.1% of $\alpha, \alpha'$-dipyridyl.

ALBERT SZENT-GYORGYI.
KÁLMÁN LAKI.
MIHÁLY GERENDÁS.

REFERENCES CITED

The following references are of record in the file of this patent:

UNITED STATES PATENTS

| Number | Name | Date |
| --- | --- | --- |
| 2,398,077 | Smith | Apr. 9, 1946 |

OTHER REFERENCES

Cekada: Amer. Journ. Physiol., vol. 78 (Nov. 1926), pp. 512–519, 529–532.

Astrup et al.: J. Biol. Chem. (May 1940), pp. 761–764.

Seegers: J. Biol. Chem., vol. 136, pp. 103–111 (Oct. 1940).

Seegers et al.: J. Biol. Chem., vol. 146, pp. 511–518 (Dec. 1942).

Certificate of Correction

January 24, 1950

Patent No. 2,495,298

ALBERT SZENT-GYORGYI ET AL.

It is hereby certified that errors appear in the printed specification of the above numbered patent requiring correction as follows:

Column 4, line 7, and column 6, lines 16 and 21, for "0.1%" read *0.01%*; column 4, line 31, for "1%" read *0.1%*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*